United States Patent
Sepp et al.

(10) Patent No.: US 9,587,619 B2
(45) Date of Patent: Mar. 7, 2017

(54) SYSTEMS COMPRISING A PLURALITY OF SHAFTS AND CONNECTING CHANNEL

(71) Applicant: TECHNISCHE UNIVERSITÄT MÜNCHEN, München (DE)

(72) Inventors: Albert Sepp, Riegsee/Hagen (DE); Peter Rutschmann, Grünwald (DE); Maria Olivier, Annweiler (DE)

(73) Assignee: Technische Universität München, München (DE)

( * ) Notice: Subject to any disclaimer, the term of this patent is extended or adjusted under 35 U.S.C. 154(b) by 30 days.

(21) Appl. No.: 14/435,666

(22) PCT Filed: Oct. 17, 2013

(86) PCT No.: PCT/EP2013/003119
§ 371 (c)(1),
(2) Date: Apr. 14, 2015

(87) PCT Pub. No.: WO2014/060102
PCT Pub. Date: Apr. 24, 2014

(65) Prior Publication Data
US 2015/0285209 A1  Oct. 8, 2015

(30) Foreign Application Priority Data
Oct. 17, 2012 (DE) ........................ 10 2012 020 456

(51) Int. Cl.
*F03B 13/00* (2006.01)
*F03B 13/10* (2006.01)
(Continued)

(52) U.S. Cl.
CPC .............. *F03B 13/08* (2013.01); *E02B 8/085* (2013.01); *F03B 13/10* (2013.01); *E02B 9/06* (2013.01); *Y02E 10/22* (2013.01)

(58) Field of Classification Search
USPC .................................. 290/43, 52, 54; 405/78
See application file for complete search history.

(56) References Cited

U.S. PATENT DOCUMENTS

| | | | |
|---|---|---|---|
| 921,687 A * | 5/1909 | Flynn ........................ | E02B 9/00 290/4 D |
| 3,596,468 A * | 8/1971 | Fairbanks ............... | E02B 8/085 405/83 |

(Continued)

FOREIGN PATENT DOCUMENTS

| | | | | |
|---|---|---|---|---|
| DE | 102009037196 | * | 10/2010 | ............... E02B 7/44 |
| EP | 2 420 669 A2 | | 2/2012 | |

(Continued)

OTHER PUBLICATIONS

International Search Report received in International Patent Application No. PCT/EP2013/003119, dated Mar. 24, 2014.

*Primary Examiner* — Pedro J Cuevas
(74) *Attorney, Agent, or Firm* — Michael Best & Friedrich LLP (57) ABSTRACT

A shaft power plant for generating electricity by energy conversion of an outflow between upper water and lower water in a river includes at least two power plant modules, each having a vertical shaft with an open top and a shaft crown forming an inflow plane. The inflow plane is substantially parallel with the river bed and extends below a water level of the upper water. Each of the power plant modules also has a turbine generator unit arranged in the shaft. The power plant also includes an ecological connecting channel formed as an outflow from the upper water into the lower water without generating electricity by energy conversion.

20 Claims, 10 Drawing Sheets

(51) Int. Cl.
  *H02P 9/04*  (2006.01)
  *F03B 13/08*  (2006.01)
  *E02B 8/08*  (2006.01)
  *F01D 15/10*  (2006.01)
  *F02C 6/00*  (2006.01)
  *H02K 7/18*  (2006.01)
  *E02B 9/06*  (2006.01)

(56) References Cited

U.S. PATENT DOCUMENTS

| | | | | |
|---|---|---|---|---|
| 4,289,971 A * | 9/1981 | Ueda | ............... | F03B 13/08 290/52 |
| 4,319,142 A * | 3/1982 | Mayo, Jr. | ............... | E02B 9/00 290/52 |
| 4,345,159 A * | 8/1982 | Gutierrez Atencio | .. | F03B 13/08 290/43 |
| 4,674,279 A * | 6/1987 | Ali | ............... | F03B 15/14 290/43 |
| 4,998,846 A * | 3/1991 | Evstratov | ............... | E02B 9/00 290/52 |
| 5,567,078 A * | 10/1996 | Lever | ............... | E02B 1/003 114/40 |
| 5,882,143 A * | 3/1999 | Williams, Jr. | ............... | E02B 9/00 290/53 |
| 6,467,998 B1 | 10/2002 | Timms | | |
| 6,955,049 B2 * | 10/2005 | Krouse | ............... | F03B 13/10 290/43 |
| 7,478,974 B1 * | 1/2009 | Kelly | ............... | E02B 9/02 405/75 |
| 7,708,494 B2 * | 5/2010 | McLaughlin | ............... | E02B 8/08 405/80 |
| 8,072,089 B2 * | 12/2011 | Krouse | ............... | F03B 13/08 290/43 |
| 8,648,487 B2 * | 2/2014 | Rutschmann | ............... | E02B 9/022 290/54 |
| 8,845,231 B2 * | 9/2014 | Holstein | ............... | E02B 9/022 290/54 |
| 8,901,767 B2 * | 12/2014 | Krouse | ............... | F03B 13/08 290/42 |
| 9,109,571 B2 * | 8/2015 | Sepp | ............... | E02B 7/44 |
| 2008/0101867 A1 * | 5/2008 | McLaughlin | ............... | E02B 8/08 405/83 |
| 2008/0213045 A1 * | 9/2008 | Tappel | ............... | E02B 8/085 405/81 |
| 2009/0134623 A1 * | 5/2009 | Krouse | ............... | F03B 13/08 290/43 |
| 2012/0201672 A1 * | 8/2012 | Sepp | ............... | E02B 7/44 415/221 |
| 2012/0235416 A1 * | 9/2012 | Rutschmann | ............... | E02B 9/022 290/54 |
| 2012/0292907 A1 * | 11/2012 | Krouse | ............... | F03B 13/08 290/52 |
| 2013/0140825 A1 * | 6/2013 | Holstein | ............... | E02B 9/022 290/54 |

FOREIGN PATENT DOCUMENTS

FR    2 865 226 A1    7/2005
KR    2011 0000468 A    1/2011

* cited by examiner

Section E-E

Fig. 6b

Section D-D

SYSTEMS COMPRISING A PLURALITY OF SHAFTS AND CONNECTING CHANNEL

FIELD OF THE INVENTION

The invention relates to a shaft power plant comprising a plurality of shafts for generating electricity by energy conversion of an outflow between upper water and lower water in a river, and to an ecological connecting channel in a transverse structure in a river.

BACKGROUND OF THE INVENTION

The prior art includes various designs for hydroelectric power plants in rivers. Generally, a transverse structure is erected in the river and the dammed water is handled at a bank-side location via turbines with an accessible power house. What is always a problem with conventional constructions is the significant interference in the natural flow of the river and the resulting negative ecological influences in particular upon passability for creatures living in the waterway.

SUMMARY OF THE INVENTION

The invention provides, in one aspect, a shaft power plant for generating electricity by energy conversion of an outflow between upper water and lower water in a river. The power plant includes at least two power plant modules, each having a vertical shaft with an open top and a shaft crown forming an inflow plane, which is substantially parallel with the river bed and which extends below a water level of the upper water. Each of the power plant modules also has a turbine generator unit arranged in the shaft. The power plant also includes an ecological connecting formed as an outflow from the upper water into the lower water without generating electricity by energy conversion.

The invention provides, in another aspect, an ecological connecting channel in a transverse structure in a river separating an upper water from a lower water of the river. The ecological connecting channel includes a constant outflow from the upper water into the lower water without generating electricity by energy conversion. The ecological connecting channel extends from the transverse structure in a direction of the upper water.

The invention provides a shaft power plant which permits efficient use of the hydro-power in a river whilst ensuring the best possible level of ecological compatibility and cost-effective production. The invention also provides, for a damming body, an effective ecological element in the form of an ecological connecting channel which is cost-effective to produce and permits ecologically compatible passability of a transverse structure in a river for aquatic organisms and preferably also comprises a natural substitute habitat with almost original flow conditions.

The invention provides, in yet another aspect, a shaft power plant for generating electricity by energy conversion of an outflow between upper water and lower water in a river, comprising at least two power plant modules each having a vertical shaft which is open at the top and the shaft crown of which forms an inflow plane which is substantially in parallel with the river bed and extends under the water level of the upper water, and a turbine generator unit which is arranged in the shaft, preferably in a horizontal to vertical arrangement. Furthermore, the shaft power plant comprises an ecological connecting channel. The connecting channel is arranged preferably between the at least two power plant modules. The connecting channel is formed as an outflow from the upper water into the lower water without generating electricity by energy conversion.

The ecological connecting channel is arranged preferably between the at least two power plant modules. Alternatively, the connecting channel can also be arranged next to the power plant modules, i.e. between a bank and a power plant module. Flowing in the ecological connecting channel is an outflow which in energy terms cannot be used and which constantly ensures passability from the lower water into the upper water and vice versa. The connecting channel forms e.g. with a river course configured to be almost natural, preferably in the center of the river, a valuable habitat with dynamic flow conditions and passability between the two bodies of water (upper water and lower water). The ecological connecting channel can also be produced with a technical design. An arrangement of the power plant modules close to each bank has the advantage of direct accessibility. The power plant modules each comprise a vertical shaft which is open at the top. The shaft crowns form an inflow plane, preferably a substantially horizontal inflow plane. Arranged in this inflow plane is a screen, preferably with small bar spaced intervals. The inflow plane with the screen is substantially in parallel with the river bed and extends under the water level of the upper water. As a result, the complete inflow plane with the screen is arranged underwater. Located in each shaft is a turbine generator unit for generating electricity by converting the energy of the outflow. By using a plurality of power plant modules each with a shaft and a turbine generator unit, preferably in a horizontal to vertical arrangement, the shaft power plant in accordance with the invention can be constructed in modular fashion. By virtue of the fact that a plurality of shafts are used, it is possible accordingly to use small turbine generator units. The turbine generator units are completely sunk in the shaft and no additional drained accesses to the turbine generator units are required. The electricity is generated directly in the turbine generator units underwater.

In a preferred manner, it is provided that the connecting channel extends from the outlet of the power plant module towards the upper water. Preferably, the gradient of the connecting channel is on average, measured over the entire length in the direction of flow, at least 1:20, preferably at least 1:25, particularly preferably at least 1:30 and can be arranged to be even flatter fundamentally and in particular in the case of a dispersed ramp design. This ensures that on the one hand by reason of the entrance arrangement at the height of the suction hose outlet there is no dead end flow for the fish and on the other hand optimum findability is ensured. The shallow gradient allows fish to swim without any problem between the entrance on the upper water side into a migration channel and the power plant inlet. A dispersed ramp design includes e.g. an intermediate basin in the connecting channel. The gradient is defined as "height to length" (height:length). In particular, the height of fall is decisive in this case so that e.g. a height of fall of 4 m and a required gradient of 1:20 gives a length of the connecting channel of 80 m. Accordingly, it is defined that, in a preferred manner, a length of the connecting channel is at least 20 times, preferably at least 25 times, particularly preferably at least 30 times, the height of fall between the upper water and the lower water. The gradient and length are designed preferably according to averaged values with respect to the outflow and the height of fall.

A width of the connecting channel, measured transversely with respect to the direction of flow, is at least 5%, preferably at least 10%, particularly preferably at least 15%, of the width of the river. If the connecting channel is designed to be wider, the energy generation of the shaft power plant is reduced, as less outflow is available across the turbine generator units as long as the expansion outflow is not achieved. The expansion outflow is the maximum possible flow through the turbine generator units. However, the connecting channel simulates as much as possible the natural course of the river, so that a wide design also produces an extensive living environment with natural waterway dynamics. The connecting channel can be dimensioned in accordance with the local ecological value of the waterway.

The connecting channel terminates, as seen in the direction of flow of the waterway, approximately at the height of the power plant modules. Fish swimming upstream generally follow the strongest current and thus swim towards the power plant modules. By virtue of the fact that the connecting channel terminates at the power plant modules, the fish find a short path to the connecting channel in the center of the river.

Preferably, the shaft power plant comprises in the transition from the suction hose to the river bed a trough-shaped depression and thus comprises a stilling basin. The stilling basin is used for converting energy in the outlet structure, is arranged at the outlets of the power plant modules and extends preferably across the entire width of the river. As a result, the stilling basin is also arranged between the connecting channel and the further course of the lower water. The stilling basin is necessary for all outflows which do not pass through the turbines, for which reason a controlled energy conversion in the form of a hydraulic jump is effected to ensure that any scouring which jeopardises stability is avoided.

The height difference from the bed in the connecting channel to the stilling basin is substantially less than the height difference from the inflow plane on the shaft crowns to the stilling basin. The course of the bed from the connecting channel, in particular via the stilling basin, to the lower water bed is preferably configured to allow the passage of fish in order give the fish an opportunity to ascend from the lower water into the connecting channel and beyond the connecting channel into the upper water. This design allowing the passage of fish is preferably formed as a rock ramp and/or rough channel and/or fish pass and/or dispersed bed ramp. Furthermore, the transition from the connecting channel to the lower water and the connecting channel itself preferably have different water depths. This produces shallow water zones which are used by specific living creatures.

Furthermore, it is preferably provided that a lateral fish ladder is arranged between each of the two banks of the river and the respectively adjoining power plant module. As a result, the fish swimming upstream have three options across a wide area for ascending, namely the two lateral fish ladders and the connecting channel.

Preferably, the connecting channel is defined on both sides by a respective channel wall. The channel walls extend preferably in parallel with the banks of the river. The channel walls are located perpendicular to the bed or are inclined with respect to the perpendicular. In particular, the channel walls are formed over the entire length of the connecting channel. The channel walls are higher than the inflow plane at the shaft crowns. In particular, a certain upper water level is taken as the starting point. This upper water level is defined as the height of the upper water above the inflow plane with the in particular horizontal screen. The reach is designed so as to ensure in general an upper water level with a sufficient overlap, preferably 0.5 to 5 m, above the inflow plane and thus above the screen. The height of the channel walls is preferably above this upper water level so that in general no outflow is discharged laterally via the channel walls into the connecting channel. The connecting channel is at least partially open merely at its end sides so that when the upper water is at a minimum level the ecologically required base outflow flows via the upper water-side end side into the connecting channel and flows out via the lower water-side entrance or via the lower water-side end side. In special cases, in particular in the case of very large and wide waterways, openings can also additionally be provided in the sidewalls, thus creating further flow paths and migration options. The base outflow is the constantly required, minimum outflow to meet ecological requirements. At the upper water-side end, the inflow cross-section is partially placed into the connecting channel preferably by means of disruptive stones. This preferably narrowed arrangement makes it possible to dimension the inflow into the connecting channel. The lower water-side end side is arranged for instance in the power plant modules.

The plurality of power plant modules of the shaft power plant in accordance with the invention form a transverse structure which extends preferably substantially over the entire width of the river. This transverse structure is penetrated by the connecting channel. Preferably, the connecting channel is arranged in the center of the river. In a particularly preferred manner, at least two of the power plant modules each having a shaft and a turbine generator unit are located in each case on both sides of the connecting channel.

The shafts of each power plant module comprise a first shaft wall and a second shaft wall. The first shaft wall faces towards the lower water. The second shaft wall faces towards the upper water. Extending between the two shaft walls are intermediate walls of the shaft. These intermediate walls thus form the boundary between two adjacent shafts. In particular, each shaft comprises in its inflow plane a dedicated horizontal screen plane. The screens can also be inclined by up to +/−10° with respect to the horizontal plane.

First closure elements are arranged in the first shaft walls. In particular, it is provided that a first closure element is arranged in each first shaft wall of each shaft. The first closure element is, in particular, a movable lock gate. The height of the first closure elements defines the reach and thus the upper water level. During normal operation of the shaft power plant, i.e. when handling the outflow via the turbine generator units, the first closure elements are adjusted in such a manner that an overflow is always and permanently present therein. A portion of the outflow thus does not flow through the screens and through the turbine generator units but rather flows directly over the first closure elements into the stilling basin or into the lower water. This permanent overflowing substantially renders it possible to avoid the formation of vortexes above the inflow plane or above the screens and at the same time allows the fish to be able to swim over the first closure elements from the upper water into the lower water. The first closure elements have in particular apertures installed therein at different heights, so-called descending windows, in order to ensure that the fish have a sufficient flow cross-section at their disposal for descending with the permanent overflow. Furthermore, the first closure elements are preferably formed in such a manner that they can be raised in a time-controlled manner. Raising the first closure elements produces a gap between the screen surface and the lower edge of the first closure elements. Fish travelling at the bottom, e.g. eels, can migrate downstream via this gap.

The screen and the overlap must be large enough in order to avoid excessive flow speed through the screen into the shaft. The overlap defines in this case the water level above the screen. An appropriately large screen with a small bar spaced interval at each shaft can ensure that the fish are not urged against the screen and not through the shaft and the turbine generator units but rather submerge with the permanent overflow or overflow and underflow of the descending windows via the first connecting units in a water cushion to be ensured and swim away into the lower water.

The optimum area of the screen is calculated from a factor F multiplied by the outflow in cubic meters per second flowing through the shaft and through the associated turbine generator unit. The factor F is preferably between 2 and 10, in particular between 2.5 and 10. Seconds per meter must be selected for the unit of the factor so as finally to give an area of the screen in square meters. If the outflow for each shaft is e.g. 10 cubic meters per second and the factor F is 2.5 seconds per meter, this gives a screen area of 25 m². The screens and thus also the cross-sections of the shafts are configured preferably at right angles in plan view, wherein preferably a ratio of width to length of the screen is between ⅕ and 5.

Preferably, the shafts adjoin one another on the respective side of the connecting channel so that water flows into the shafts merely via the second shaft walls.

Preferably, second closure elements are provided in the second shaft walls. These second closure elements are located between the inflow plane or the screen and the upper water. In particular, the second closure elements are arranged in such a manner that they adjoin one another directly on the respective side of the connecting channel. As a result, it is possible, by closing the second closure elements, to drain all of the shafts on one side of the connecting channel at the same time. This permits a simple revision, e.g. of the turbine generator units or screen cleaning, in the shafts. The second closure elements can be produced e.g. by inflatable weirs or by movable shutters or by simple dam bars (installed and removed e.g. using a truck-mounted crane).

In particular, it is provided that a second closure element is arranged on each shaft.

Furthermore, it is preferably provided that the second closure elements can be moved to at least three positions. In the lowermost position, the second closure elements are completely open and permit unhindered inflow of the water into the shafts. In the uppermost position, an upper edge of the second closure elements is located above the upper water level so that the shafts are drained. In an intermediate position, hydraulic energy is generated with the formation of a change of flow above the screen plane so that a flushing effect occurs above the respective screen.

The shaft power plant is thus integrated into a combined weir system, wherein in particular the first closure elements can be used for controlling the water level in dependence upon the outflow. The upper edge of the sidewalls of the connecting channel is located preferably above the minimum water level. If the inflow is larger than the expansion outflow, the upper water level can be allowed to rise, whereby in addition to the greater height of fall a controlled increase of outflow is effected via the end side to the connecting channel. As a result, a further positive ecological effect can be achieved by increasing the flow dynamics in the connecting channel. High water is discharged by lowering the first closure elements and very powerfully when the upper water level rises through the large overflow length along the sidewalls, in particular along end-sidewalls, of the connecting channel. The structure of the ecological connecting channel should be designed to be substantially stable with respect to high water, wherein in particular the edge regions are to be secured.

Arranged in each of the shafts is a turbine generator unit. The turbine generator units are formed in particular as submerged turbines with an integrated generator. This means that no dry accesses whatsoever to the turbine generator units is required. The turbine generator units are secured with their outlet side to a wall or to a base of the shaft. The outflow flows in the direction of the lower water through the outlet side and through the wall or through the base. With the exception of the outlet side, water flows completely around the turbine generator units in the shafts. Only one electricity-carrying line or lines for the drives lead(s) from the turbine generator units outwards to the bank. Located at the bank—e.g. in a smaller technical building—is the transformer station for feeding the energy obtained into an electricity network. In addition, an opening can be incorporated in the lower water-side shaft wall preferably in the lower edge region, whereby in addition to continuous flushing of the shaft chamber a possible harmless descent path into the lower water is also available for very small fish which have passed through the screen.

The shaft power plant preferably comprises apparatuses for cleaning the screens. For this purpose, a cleaning bar is arranged preferably on each screen. The cleaning bar is formed in particular in the manner of a comb. By virtue of the comb-like formation, the cleaning bar can engage into the intermediate spaces between the individual screen bars. For cleaning purposes, the cleaning bar is displaced in parallel with the screen. This movement of the cleaning bars is performed by telescopic cylinders. In particular, one screen is provided for each shaft. For each shaft, a cleaning bar is provided and each cleaning bar is moved with preferably two parallel telescopic cylinders. The bars of the screens extend preferably in the direction of flow. Accordingly, the cleaning bar is moved in a reciprocating manner in parallel with the direction of flow and the screened material is conveyed into the lower water by briefly opening the first closure elements. The telescopic cylinders are located preferably on a cantilever arm of the shafts. This cantilever arm forms an extension of the upper ends of the second shaft walls.

The shaft power plant in accordance with the invention is suitable in particular for large weir sites. The individual shafts of the power plant modules are located below the water level and are thus not visible from the outside. By virtue of the permanent overflow, the first closure elements are also located underwater. The invention takes into account not only the hydro-engineering requirements of the hydraulics, sedimentation transport and high water suitability but also in particular the requirement of protection of fish and ecological passability. The connecting channel constitutes an upstream fish migration and an additional downstream fish migration in the center of the river course and furthermore also provides passability for very small living creatures in the river. The turbine generator units used generate the electricity directly and are arranged completely underwater in the shaft. Only one electricity line or supply lines has/have to be guided outwards to the plant room.

In the case of correspondingly wide rivers, it is possible to use a plurality of the ecological connecting channels in accordance with the invention. Preferably, however, a wide connecting channel is used in order to ensure accessibility of the power plant modules from the banks.

By virtue of the geometric dimension and the structural integration with sealing walls upstream and downstream of the power plant modules, the shafts including the suction pipe connection form the support body and thus the transverse structure. The stilling basin, both downstream of the power plant modules and also downstream of the connecting channel, serves to convert energy in a high water outflow.

The multiple shaft power plant ensures that during power plant operation water flows through a wide area of the river bed, optimum entrance capability and findability for passability are present, the bodies of water are connected by a variably configurable eco-flow to natural living conditions and a dynamic water level control with sedimentation passability is permitted. The integrated configuration of the power plant and weir is characterised structurally and constructively by virtue of the fact that damming body, outflow control, energy conversion and passability functions are fulfilled simultaneously.

In a preferred manner, it is provided that on the underwater-side of the at least one power plant module at least one fish guiding channel is arranged transversely with respect to the river. The at least one fish guiding channel guides the fish ascending at the lateral fish ladder installations to the ecological connecting channel. As a result, cost-intensive separate fish ladder installations which extend from the lower water to the upper water can be omitted. The fish guiding channel is secured preferably directly to the shaft walls. In a preferred manner, the width of the fish guiding channel is 30 to 150 cm.

The invention further comprises an ecological connecting channel in a transverse structure in a river. The transverse structure separates upper water from lower water in a river, wherein the ecological connecting channel is formed as a constant outflow from the upper water into the lower water without generating electricity by energy conversion. The ecological connecting channel extends from a transverse structure in the direction of the upper water. Flowing in the ecological connecting channel is an outflow which in terms of energy is not usable and which constantly ensures the passability from the lower water into the upper water and also vice versa. The connecting channel forms with a river flow which is configured to be almost natural, preferably in the center of the river, a valuable living environment with dynamic flow ratios and passability between the two bodies of water (upper water and lower water). In accordance with the invention, the ecological connecting channel can thus also be used in a transverse structure, wherein the transverse structure does not have to be used for utilising the hydroforce. The transverse structure is formed either with movable closures or as a fixed weir.

In the transverse structure, the ecological connecting channel permits passability for aquatic organisms. The ecological connecting channel extends from the transverse structure in the direction of the upper water and regulates the natural course of the river. The ecological connecting channel substantially penetrates an existing fixed or movable transverse structure. The hydraulic, structural opening is produced in such a manner that on both sides of the ecological connecting channel in each case preferably one perpendicular or inclined partition, wall and/or embankment is pulled into the upper water, and between the partitions, walls and/or embankments an inclined ramp to the height of the river bed extends into the upper water. The formation of the ecological connecting channel can be configured very freely and almost in any manner both in aesthetic terms (in relation to design, material selection and cultivation of plant life) and in terms of the hydraulic mode of operation and the provision of living environments. In the case of large waterways where energy is not utilised, openings can preferably be provided in the sidewalls, thus producing further flow paths and migration options. The connecting channel terminates approximately at the height of the transverse structure and it can readily be found by ascending fish. The outflow capacity of the transverse structure in the case of high water does not decrease in spite of the ecological connecting channel and thus a potential reduction in the outflow-effective width, or can even be increased depending upon the design since the connecting channel in the upper water of the transverse structure provides an additional fetch length for relief from high water. Closure elements preferably used at the end-side inflow into the connecting channel or along the lateral fetch length, e.g. in the form of closures or hoses, render it possible to control the outflow capacity via the additional fetch length in the event of high water. The entire system can thus be loaded with significant outflows and is still cost-effective to produce. The system is not only used for ascent and descent but also constitutes a living environment for aquatic organisms. The ecological connecting channel can be adapted variably to the living creatures present and living creatures both small and large are able to pass therethrough.

The ecological connecting channel is arranged preferably between two parts of the transverse structure. Alternatively, the ecological connecting channel can also be arranged next to the transverse structure, i.e. between a bank and the transverse structure. In the case of multi-section weir systems, a closure section can preferably be replaced by an ecological connecting channel.

Preferably, the gradient of the ecological connecting channel is on average, measured over the entire length in the direction of flow, at least 1:20, preferably at least 1:25, particularly preferably at least 1:30, and can be arranged to be even flatter in the case of a dispersed ramp design. This ensures that on the one hand there is no dead end flow for the fish and on the other hand optimum findability is ensured. A length of the ecological connecting channel is, in a preferred manner, at least 20 times, preferably at least 25 times, particularly preferably at least 30 times, the height of fall between the upper water and the lower water. The gradient and length are designed preferably in accordance with averaged values of the outflow and of the height of fall.

A width of the ecological connecting channel, measured transversely with respect to the direction of flow, is, in a preferred manner, at least 5%, preferably at least 10%, preferably at least 15%, preferably at least 20%, preferably at least 25%, particularly preferably at least 30% of the width of the river. Therefore, the ecological connecting channel simulates as much as possible the natural course of the river, so that a wide design also produces an extensive living environment with natural waterway dynamics. The ecological connecting channel can be dimensioned in accordance with the local ecological value of the waterway.

The ecological connecting channel terminates, as seen in the direction of flow of the waterway, approximately at the height of the transverse structure. As a consequence, fish find a short path to the ecological connecting channel, e.g. in the center of the river.

Preferably, the transverse structure comprises a stilling basin. The stilling basin is used for converting energy in the outflow structure and extends preferably over the entire width of the river. As a consequence, the stilling basin is also arranged between the ecological connecting channel and the further course of the lower water.

The course of the bed from the ecological connecting channel, in particular via the stilling basin, to the lower water bed is preferably configured to allow the passage of fish in order to give the fish an opportunity to ascend from the lower water into the ecological connecting channel and beyond the connecting channel into the upper water. This design allowing the passage of fish is preferably formed as a rock ramp and/or rough channel and/or fish pass and/or dispersed bed ramp. Furthermore, the transition from the ecological connecting channel to the lower water and/or the ecological connecting channel itself preferably has/have different water depths. This produces shallow water zones which are used by specific living creatures. The static configuration of the ecological connecting channel is to be designed for the friction forces in the case of high water outflow or for the hydraulic energy as a result of the overfall flow. The bed substrate must be controlled and possibly replenished in the event of high water outflows.

Furthermore, it is preferably provided that a lateral fish ladder is arranged between each of the two banks of the river and the adjoining transverse structure. As a result, the fish swimming upstream have three options across a wide area for ascending, namely the two lateral fish ladders and the ecological connecting channel.

Preferably, the ecological connecting channel is defined on both sides by a respective channel wall. The channel walls extend preferably in parallel with the banks of the river. The channel walls are located perpendicular to the bed or are inclined with respect to the perpendicular. In particular, the channel walls are formed over the entire length of the ecological connecting channel. Preferably, the height of the channel walls is at least partially above the upper water level so that in general, i.e. small and medium-size waterways, no outflow is discharged laterally over the channel walls into the ecological connecting channel. In the case of large waterways where energy is not utilised, openings can preferably be provided in the sidewalls, thus producing further flow paths and migration options. The ecological connecting channel is at least partially open preferably merely at its end sides so that when the upper water is at a minimum level the ecologically required base outflow flows via the upper water-side end side into the ecological connecting channel and flows out via the lower water-side entrance or via the lower water-side end side. The base outflow is the constantly required, minimum outflow to meet ecological requirements. At the upper water-side end, the inflow cross-section is partially placed into the ecological connecting channel preferably by means of disruptive stones. This preferably narrowed arrangement makes it possible to dimension the inflow into the ecological connecting channel. The lower water-side end side is arranged for instance in the power plant modules. A closure element or closure elements for regulating the outflow can be installed particularly at the upper water-side end side of the ecological connecting channel and on the lateral fetch edges.

In the case of correspondingly wide rivers, it is possible to use a plurality of the ecological connecting channels in accordance with the invention. Preferably, however, a wide ecological connecting channel is used.

In a preferred manner, it is provided that on the under-water-side of the transverse structure at least one fish guiding channel is arranged transversely with respect to the river. The at least one fish guiding channel guides the fish ascending in lateral fish ladder installations to the ecological connecting channel. As a result, cost-intensive separate fish ladder installations can be omitted. The fish guiding channel is secured preferably directly to the transverse structure. In a preferred manner, the width of the fish guiding channel is 30 to 150 cm.

The migration of aquatic living creatures in the ecological connecting channel occurs in an active or passive manner. The passive drifting of living creatures occurs in the event of high water and is ensured even when there are obstacles from the top to the bottom. Aquatic living creatures also manage to descend actively via transverse structures—as long as the throughflow is guaranteed—normally without being harmed and therefore it is necessary above all to ensure the ascent. Living creatures which try to move from the bottom to the top in the river normally gather at transverse structures. If natural or artificial ascending aids are provided this always gives rise to the question of findability and, closely associated therewith, the question of quantitative loading of these installations. The ecological connecting channel in accordance with the invention provides optimum conditions for findability because the entrance into the connecting channel is arranged in the same cross-section and in the immediate vicinity of the obstacle or the competing flow patterns.

The ecological connecting channel in accordance with the invention has the crucial advantage that it not only has optimum findability but that it can also be loaded hydraulically in an optimum manner in accordance with ecological criteria and can be configured geometrically, materially and with adapted cultivation of plant life and therefore an additional living environment is provided for aquatic organisms.

Previously known migration aids must generally find space next to existing transverse structures and cannot be integrated into the transverse structures, since in particular extensive maintenance outlay would be required and inadequate maintenance results in only limited functionality. For reasons of cost, these migration aids are also designed to have fairly modest dimensions and water loading facilities for the most part. The ecological connecting channel in accordance with the invention in the form described in this case can have considerable dimensions and loading facilities without adversely affecting the capacity of existing weirs, since the connecting channel increases the length of the overflow edges (fetch lengths) and decouples the outflow via the fetch length from the overflow via the transverse edge and thus permits a considerable increase in the outflow of existing weirs. Therefore, it is possible when using the connecting channel in accordance with the invention to even make a contribution to high water safety or to leave open individual weir sections in the case of movable weirs in favour of the ecological connecting channel without the capacity of the weir being adversely affected or it can even be increased in certain outflow regions. A corresponding stable configuration must be taken into account.

The costs of the ecological connecting channel very much depend upon the definition of the definitive pilot fish or the size thereof. Migration aids for salmon and above all sturgeon can assume very large dimensions and thus high costs. A wide design of the ecological connecting channel presented in this case constitutes in structural terms a relatively simple solution.

The ecological connecting channel in accordance with the invention can be formed with random variability. This affects the width of the ecological connecting channel, the configuration of the lateral boundaries, the hydraulic and static configurations, the materials used and the hydraulic optimisation with functional elements. In particular, it is provided that the ecological connecting channel is designed to be very wide and that different regions are created for living creatures which are small and large and swim weakly and strongly. The ecological connecting channel can provide aquatic organisms not only with the opportunity to ascend but can also provide them with living environments. This occurs by means of adapted geometry and loading with water or by using different materials and suitable cultivation of plant life. The fetch edges can be designed optionally to be flexible, e.g. with closures or inflatable rubber dams. This makes it possible to control the upper water level, the loading of the ecological connecting channel or the high water capacity. In order to allow fish to ascend or descend, bypass solutions can be selected which "collect" the migrating organisms at relevant "collecting points" and transfer them into the ecological connecting channel.

BRIEF DESCRIPTION OF THE DRAWINGS

Exemplified embodiments of the invention will be described in detail hereinafter with reference to the accompanying drawings, in which.

DETAILED DESCRIPTION

A first exemplified embodiment of the shaft power plant 1 will be described in detail hereinafter using FIGS. 1 to 11.

Figure 1:
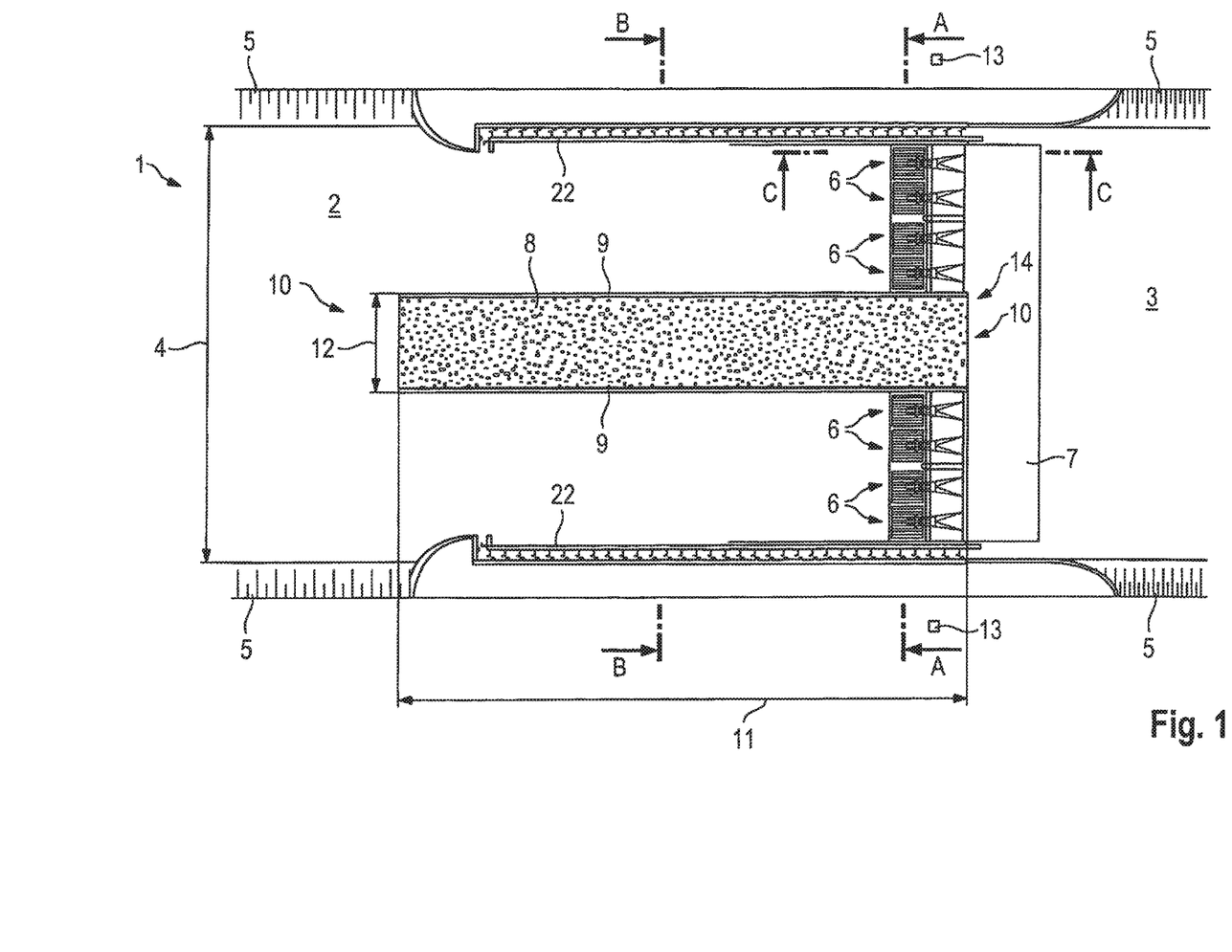
FIG. 1 shows a plan view of a shaft power plant in accordance with the invention according to a first exemplified embodiment.
Figure 2:
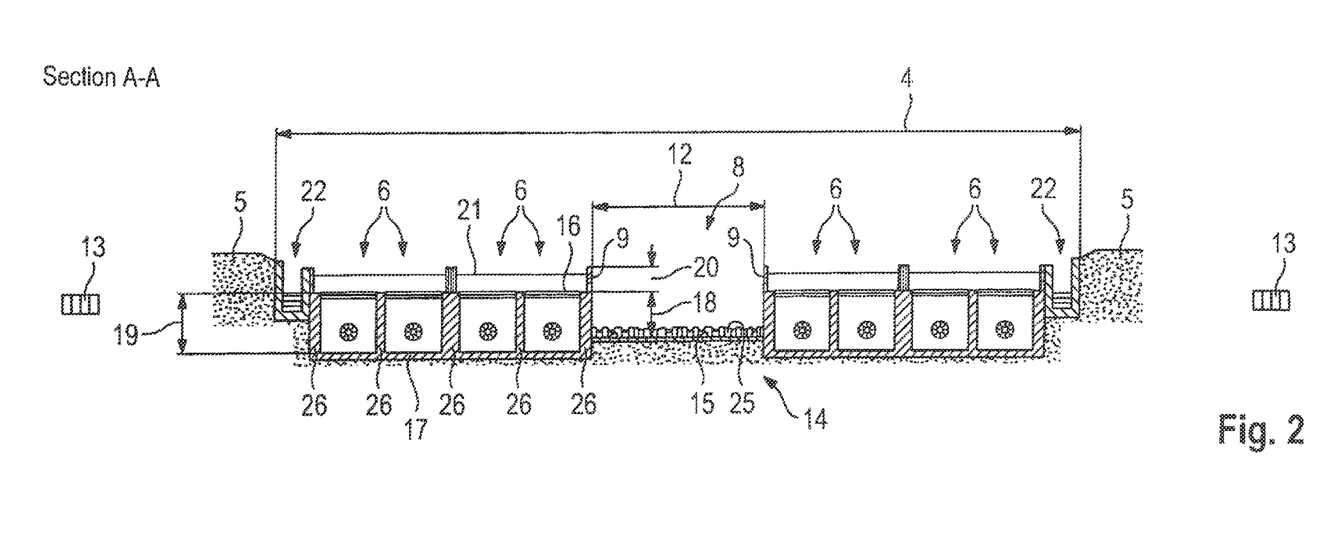
FIG. 2 shows the section A-A designated in FIG. 1.
Figure 3:
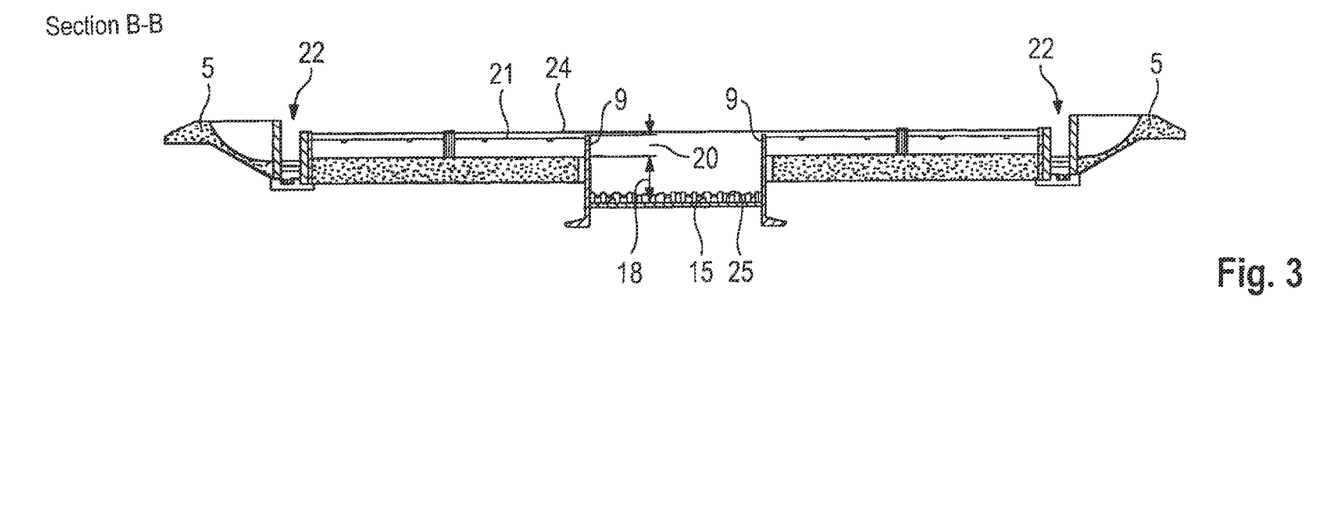
FIG. 3 shows the section B-B designated in FIG. 1.
Figure 4:
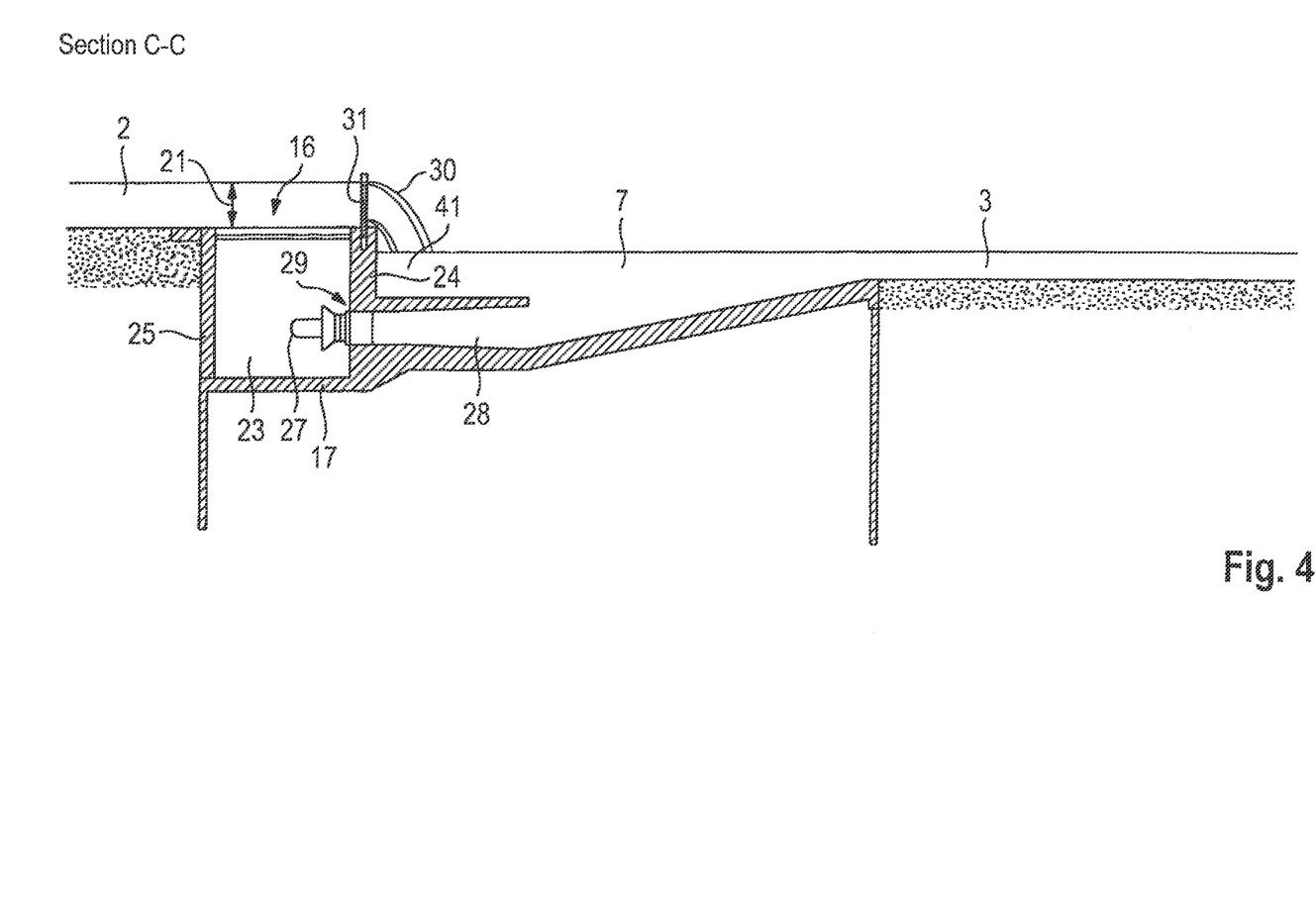
FIG. 4 shows the section C-C designated in FIG. 1.

FIG. 1 shows a plan view of the shaft power plant 1 in a river. FIGS. 2 to 4 show sectional views from FIG. 1.

The river is divided into upper water 2 and a lower water 3. The river is delimited by banks 5 on both sides. A river width 4 is defined between the two banks 5

The shaft power plant 1 is composed of several power plant modules 6 arranged in rows, an ecological connecting channel 8 and a stilling basin 7. The ecological connecting channel 8 is arranged in the center of the river. Four power plant modules 6 are located on both sides of the ecological connecting channel 8. The power plant modules 6, eight in total, together form a transverse structure in the river. This transverse structure is penetrated by the connecting channel 8.

The stilling basin 7 extends over the entire river width 4 and is thus used to convert the energy of a high water outflow over the entire river width 4.

Furthermore, lateral fish ladders 22 are arranged between the outermost power plant modules 6 and the respective bank 5. Transformers 13 are located on the banks 5 for feeding the generated electricity to an electricity network.

The connecting channel 8 is used to simulate an ecological living environment which can be passed through and is as wide as possible. As a result, the connecting channel 8 can be used for the ascent and descent of fish and to allow very small living creatures to pass through. The connecting channel 8 includes two channel walls 9. The channel walls 9 extend in parallel with the banks 5 and thus delimit the connecting channel 8 laterally with respect to the rest of the river course. The connecting channel is open at the two end sides 10 so that the water flows in on the upper water-side through one end side 10 and flows out into the lower water 3 through the other end side 10.

The end side 10 facing the lower water 3 forms an end 14 of the connecting channel 8 at the level of the power plant modules 6. Fish swimming upstream generally follow the strongest current and thus frequently swim initially towards the power plant modules 6. Because the end 14 of the connecting channel 8 is arranged in the power plant modules 6, fish find a short path to the connecting channel 8 and thus also have, in addition to the lateral fish ladders 22, an option for ascending in the center of the river.

A length 11 of the connecting channel 8 is preferably fixed in dependence upon the height of fall. For instance, the length 11 is at least 20 times the height of fall, producing a gradient of 1:20. A width 12 of the connecting channel 8 is preferably at least 5% of the river width 4.

The gradient of a river bed 15 in the connecting channel 8, with the incorporation of disruptive stones and bed substrate, follows where possible the forming of natural waterway characteristics and the ensuring of necessary flow depths. In order to attach the bed 15 in the connecting channel 8, bed attachments 25, e.g. loose or fixed stones, are provided.

Each power plant module 6 has its own shaft 23 (FIG. 4). Each shaft 23 comprises a first shaft wall 24 and a second shaft wall 25. The first shaft wall 24 faces the lower water 3. The second shaft wall 25 faces the upper water 2. Intermediate walls 26 are located between the shaft walls 24, 25. Furthermore, each shaft 23 has a shaft base 17. The two shaft walls 24, 25, two of the intermediate walls 26 and the shaft base 17 define the vertical shaft 23. The shaft 23 is open at the top, at the so-called shaft crown. A horizontal screen plane is situated at this location. The screen and thus also the shaft crown define an inflow plane 16. This inflow plane 16 is arranged in parallel with the river bed. By way of a corresponding accumulation of sedimentation, a river bed is formed in the upper water 2 upstream of the power plant modules 6 at approximately the level of the inflow plane 16.

A turbine generator unit 27 is located in each shaft 23. Each turbine generator unit 27 has an outlet side 29. The turbine generator unit 27 is mounted on the first shaft wall 24 using this outlet side 29. Electricity is generated directly in the turbine generator unit 27. There is thus a requirement merely for an electricity-carrying line and possible supply lines for the control of each turbine generator unit 27 on the bank 5 to the transformers 13. With the exception of the outlet side 29, water flows completely around the turbine generator units 27 in the shafts 23.

Section C-C in FIG. 4 particularly shows that a suction hose 28 is formed for each shaft 23. The suction hoses 28 guide the outflow handled by the turbine generator units 27 to the stilling basin 7 and thus to the lower water 3.

A first closure element 31 is provided in each shaft 23. The first closure elements 31 are arranged in the first shaft walls 24. The first closure elements 31 can be moved upwards and downwards so that an upper water level 21 can be set by the upper edge of the first closure elements 31. The upper water level 21 is defined as the height of the water above the screen or above the inflow plane 16.

Particularly FIG. 4 shows a permanent overflow 30 of the first closure elements 31. When the shaft power plant 1 is operating normally, i.e. generating electricity, this permanent overflow 30 is preferably constantly taking place so that fish can migrate over the first closure elements 31.

The upper water level 21 is defined starting from the inflow plane 16 or the screen. The inflow plane 16 further defines a shaft depth 19 which is measured from the inflow plane 16 to the respective shaft base 17 (FIG. 2). A depth 18 of the connecting channel 8 is defined between the river bed 15 in the connecting channel 8 and the inflow plane 16. A wall height 20 of the channel wall 9 is defined between an upper edge of the channel wall 9 and the inflow plane 16. A high water level 24 is likewise measured starting from the inflow plane 16.

Particularly FIG. 2 shows the upper water level 21 when the shaft power plant 1 is operating normally. The wall height 20 is greater than the upper water level 21, whereby an outflow does not flow into the connecting channel 8 at the sides. However, the high water level 24 can be above the wall height 20 which means that when high water is present an outflow flows into the connecting channel 8 from all three sides.

The river bed 15 in the connecting channel 8 is inclined to a greater extent than the river bed upstream of the power plant modules 6. As a result, the river bed 15 at the end of the connecting channel 8 is below the inflow plane 16. In particular, the depth 18 at the end is selected such that the river bed 15 is above the shaft base 17 of the shafts 23.

Figure 5:
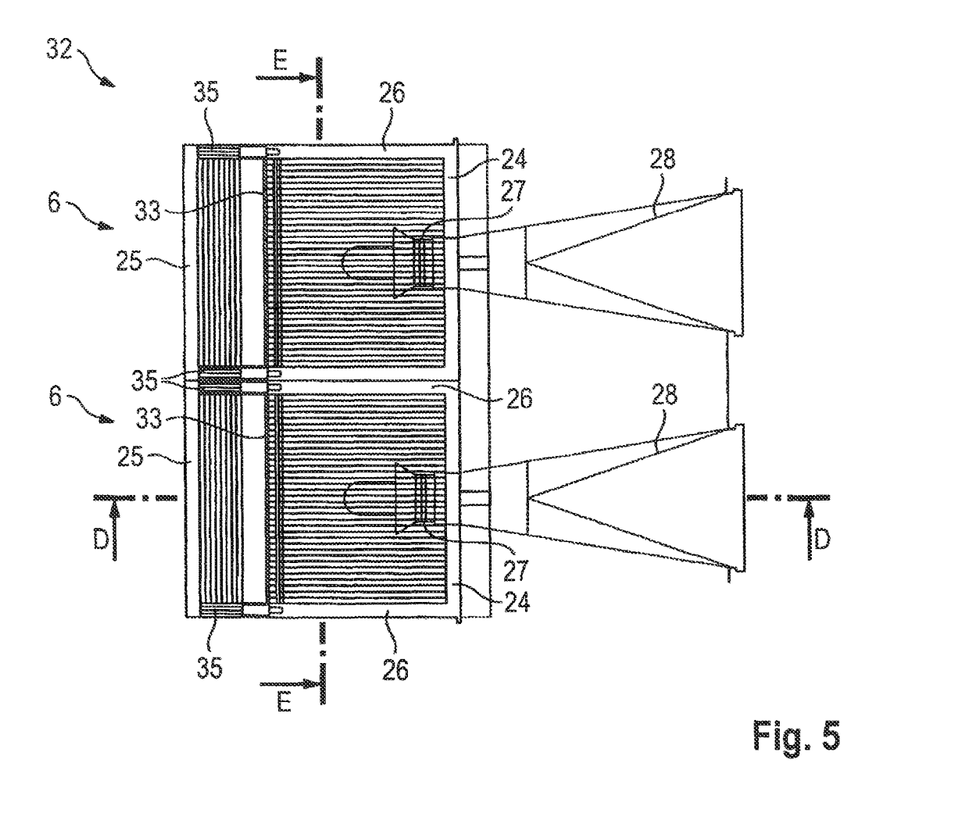
FIG. 5 shows in detail a unit consisting of two power plant modules of the shaft power plant in accordance with the invention according to the first exemplified embodiment.

FIG. 5 shows two of the power plant modules 6 which are combined to form a unit 32, as seen in plan view. Each power plant module 6 includes a cleaning bar 33 for cleaning the screen in the inflow plane 16. The cleaning bars 33 are formed in particular in a comb-like manner. For cleaning, the cleaning bars 33 are moved reciprocally on the screen. The cleaning bars 33 are moved by telescopic cylinders 35 in the exemplified embodiment.

Figure 6A:
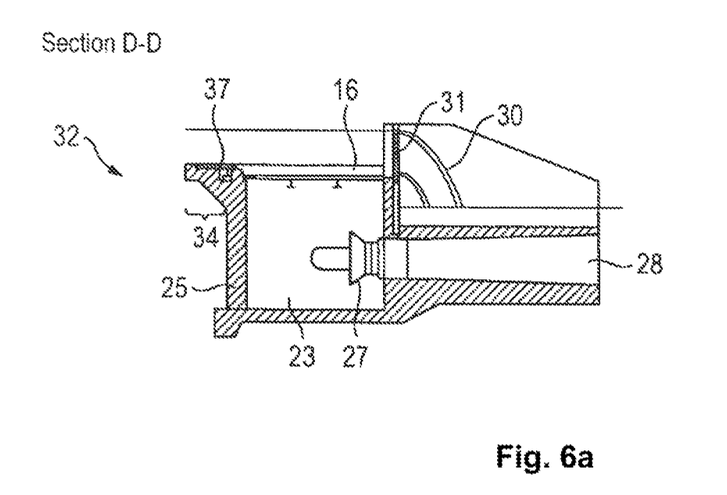
FIG. 6a shows the section D-D designated in FIG. 5.
Figure 6B:
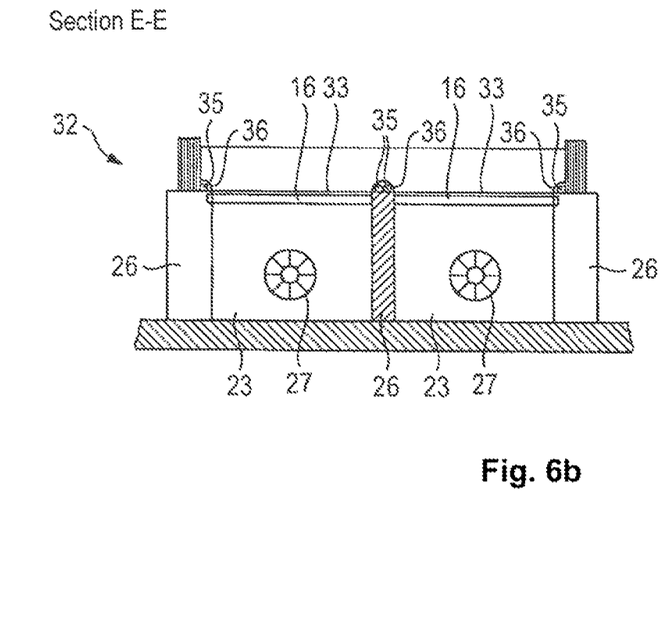
FIG. 6b shows the section E-E designated in FIG. 5.
Figure 7:
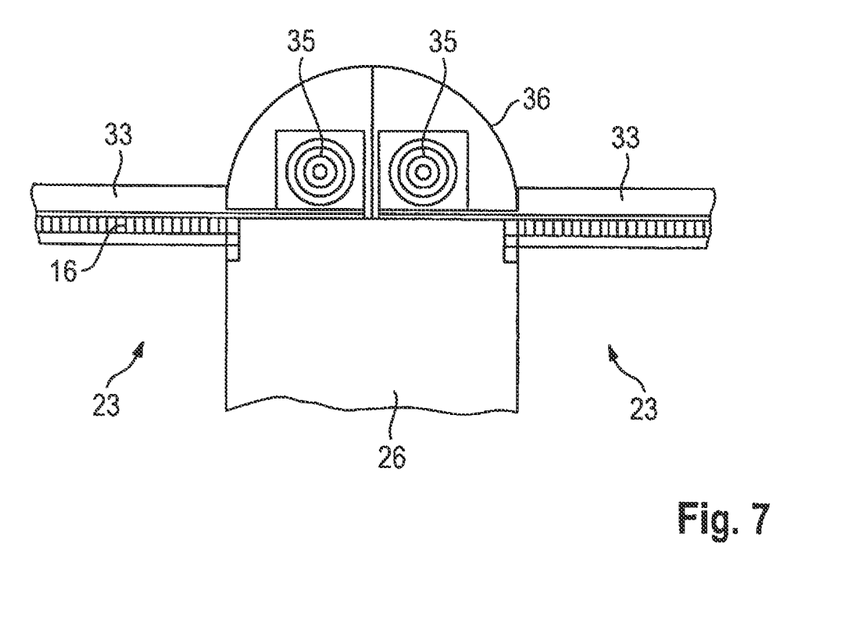
FIG. 7 shows a detail of the shaft power plant in accordance with the invention according to the first exemplified embodiment for screen cleaning.

FIGS. 6a and 6b show the sections D-D and E-E, respectively, with respect to FIG. 5. It is apparent from the section D-D that the second shaft walls 25 comprise a cantilever arm 34. This cantilever arm 34 forms an extension of the shaft crown, which extends in the direction of the upper water 2, on the second shaft wall 25. The telescopic cylinders 35 are secured to the cantilever arm 34. In order to protect the telescopic cylinders 35 from sedimentation, covers 36 are provided. The unit 32 consisting of two adjacent power plant modules 6 shows the adjacent arrangement of two telescopic cylinders 35 in the center. These two telescopic cylinders 35 can be protected by a common, in particular semi-cylindrical cover 36. This is shown in detail in FIG. 7. The covers 36 are provided with slots, in order to connect the telescopic cylinders 35 to the cleaning bars 33.

Furthermore, FIG. 6b shows the arrangement of second closure elements 37 in the cantilever arms 34. In particular, a second closure element 37 is arranged on each power plant module 6. In the illustrated exemplified embodiment, the second closure element 37 is designed as a shutter. The second closure elements 37 can be tilted about an axis of rotation located transversely with respect to the direction of flow.

Figure 8:
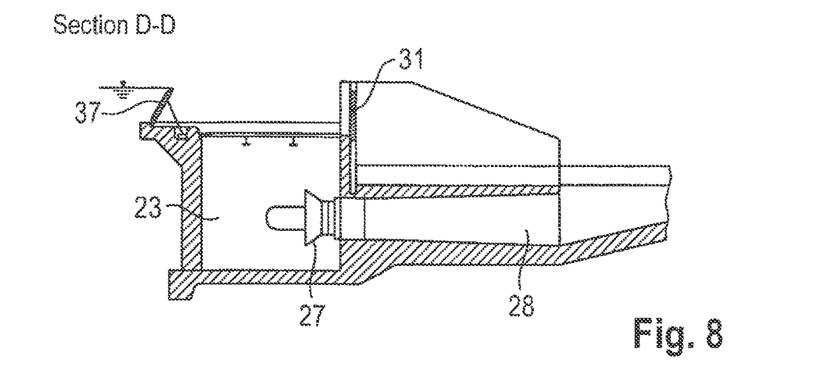
FIGS. 8-10 show the section D-D designated in FIG. 5 in three different operating states.
Figure 9:
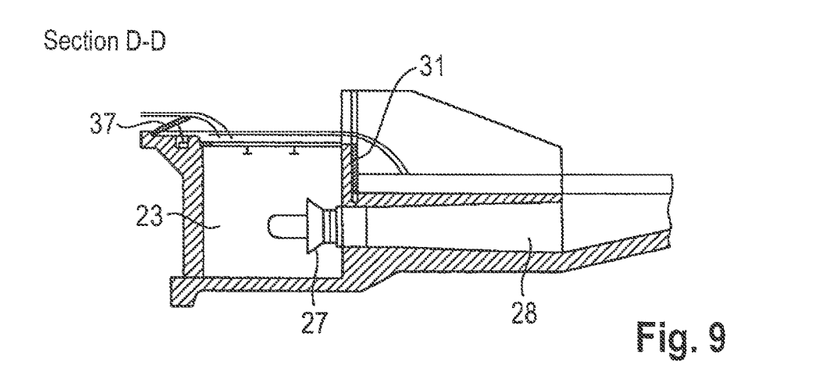
Figure 10:
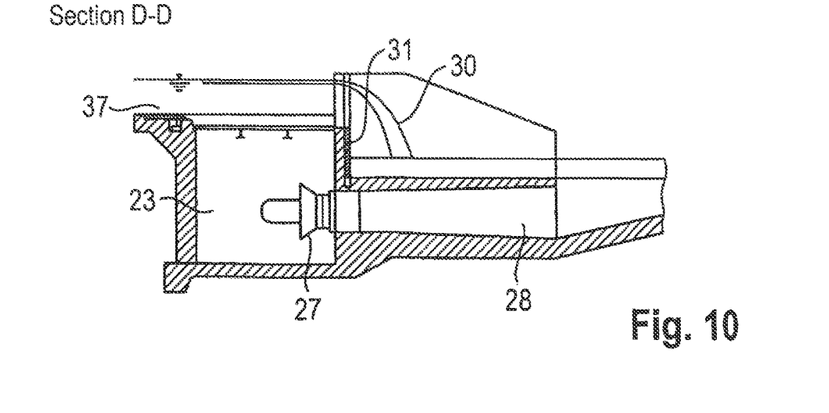

FIGS. 8 to 10 show the section D-D in different operating positions of the second closure element 37.

As shown in FIG. 8, the second closure elements 37 can be assembled completely such that the shafts 23 are drained. This permits simple revision work e.g. on the turbine generator units 27. FIG. 10 shows the closure element 27 in a completely folded position. In this case, a free outflow into the shafts 23 is possible.

FIG. 9 shows an intermediate position of the second closure elements 37 for generating a strong flow. This strong flow is able to flush the inflow region. During flushing of the inflow region and thus of the screen surface, the first closure elements 31 are completely opened.

Figure 11:
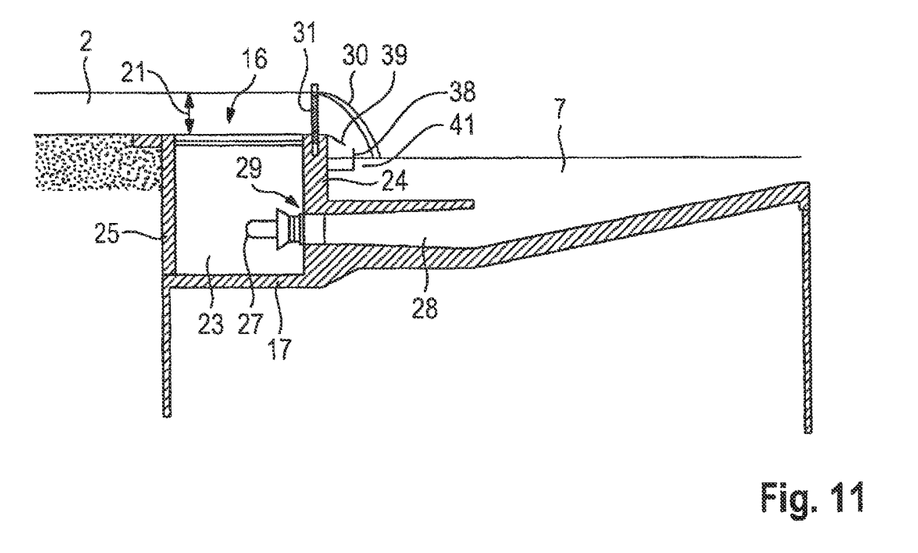
FIG. 11 shows a detail of the first exemplified embodiment.

With respect to the first exemplified embodiment, FIG. 11 shows the use of a fish guiding channel 38. The fish guiding channel 38 is arranged on the first shaft wall 24 and is located at least partially in the lower water. This fish guiding channel 38 guides ascending fish transversely with respect to the direction of flow of the river to the ecological connecting channel 8. By using the fish guiding channel 38, lateral fish ladders 22 can be omitted. Alternatively, it is also possible that the fish guiding channel 38 leads not only to the ecological connecting channel 8 but also to fish ladders 22 used on the sides. In order to protect the fish guiding channel 38 from overflowing water, primarily from sedimentation and driftwood, in particular at a lowered closure position, the fish guiding channel is bounded at the top preferably by a roof 39.

Figure 12:
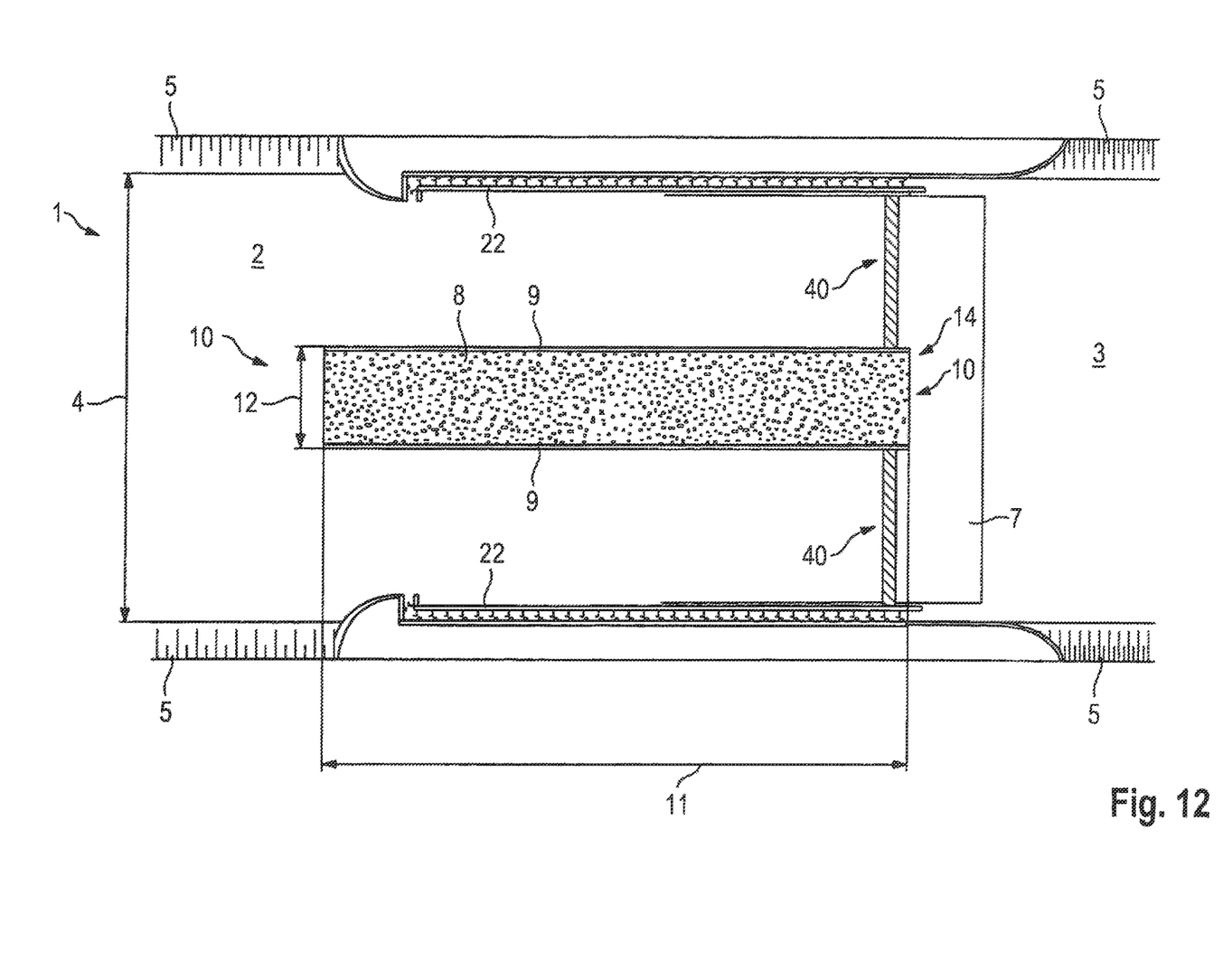
FIG. 12 shows a plan view of an ecological connecting channel in a transverse structure according to a second exemplified embodiment.

FIG. 12 shows a plan view of the ecological connecting channel 8 in a transverse structure 40. In the second exemplified embodiment, the outflow is not used for generating electrical energy. Instead of the power plant modules 6, only one transverse structure 40 is arranged. This transverse structure 40 is penetrated by the already described ecological connecting channel 8. Like components or components functioning in an identical manner are designated by the same reference numerals in the first exemplified embodiment and in the second exemplified embodiment.

Figure 13:
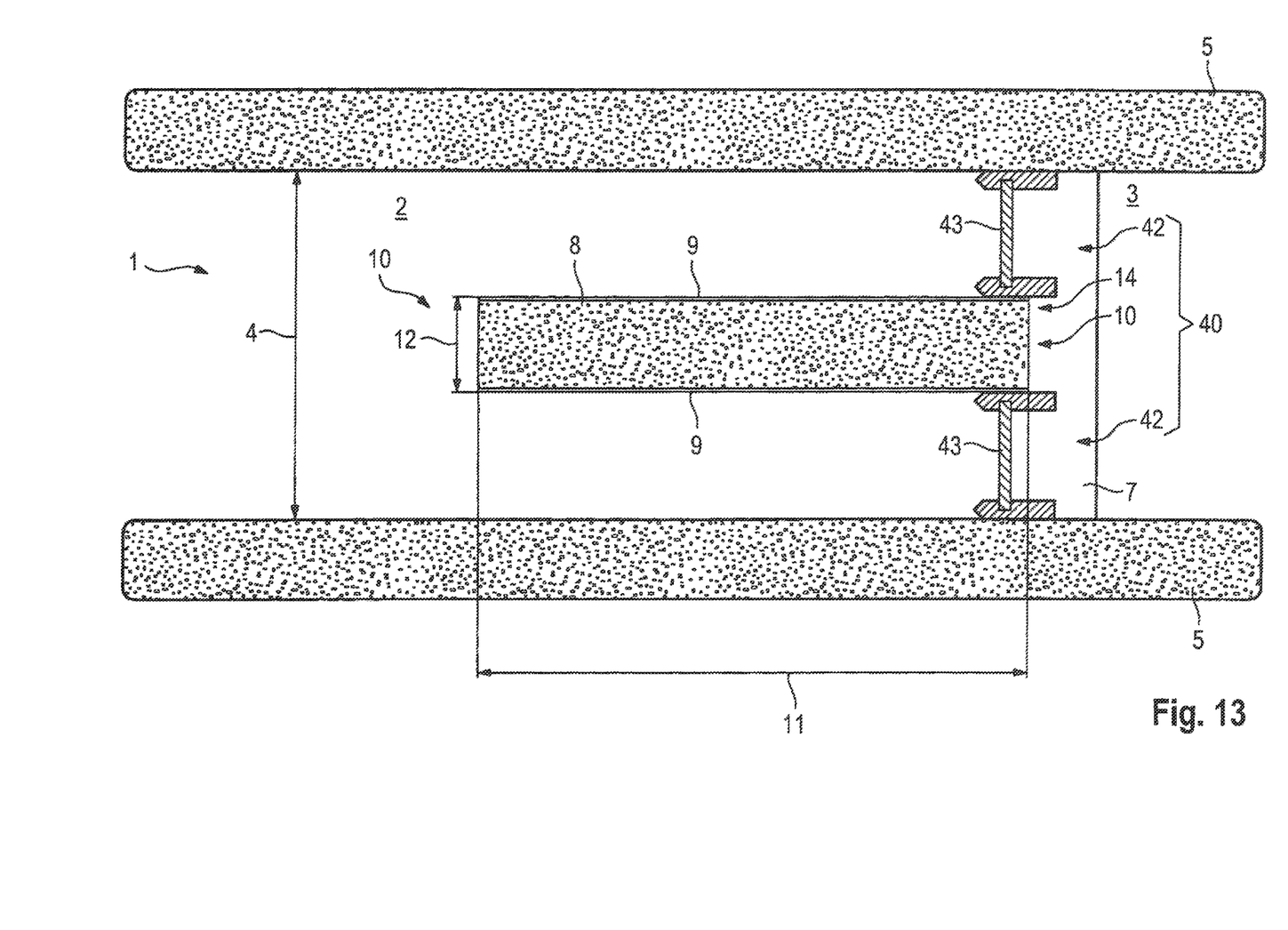
FIG. 13 shows a plan view of an ecological connecting channel in a transverse structure according to a third exemplified embodiment.

FIG. 13 shows a plan view of the ecological connecting channel 8 in a transverse structure 40 which is formed by a multiplicity of weir sections 42. A weir section 42 is thereby replaced by an ecological connecting channel 8. The weir sections 42 can be closed by closures 43, wherein the degree of closing can be adjusted by the closures 43. In a similar manner to the first exemplified embodiment and the second exemplified embodiment, like components or components functioning in an identical manner are designated by the same reference numerals in the first exemplified embodiment, the second exemplified embodiment and the third exemplified embodiment.

The fish guiding channel 38 described with reference to FIG. 11 can also be used on the transverse structure 40 of the second exemplified embodiment or of the third exemplified embodiment.

FIG. 4 and FIG. 11 show for both exemplified embodiments the formation of a basin 41 for a water cushion on the underwater-side of the power plant modules 6 or of the transverse structure 40. This basin 41 allows descending fish to submerge harmlessly into the lower water 3. Ascending fish can swim in the basin 41 as far as to the fish guiding channel 38.

Various features of the invention are set forth in the following claims.

The invention claimed is:

1. A shaft power plant for generating electricity by energy conversion of an outflow between upper water and lower water in a river, the power plant comprising:

at least two power plant modules each having
a vertical shaft with an open top and a shaft crown forming an inflow plane, which is substantially parallel with the river bed and which extends below a water level of the upper water, and
a turbine generator unit arranged in the shaft, and an ecological connecting channel, wherein the connecting channel is formed as an outflow from the upper water into the lower water without generating electricity by energy conversion,
wherein the connecting channel is defined on both sides by a channel wall and is at least partially open at a first end side and a second end side.

2. The shaft power plant of claim 1, wherein the connecting channel extends from the power plant modules in a direction of the upper water, and wherein an average gradient of the connecting channel is at least 1:20.

3. The shaft power plant of claim 1, wherein the connecting channel extends from the power plant modules in a direction of the upper water, and wherein a length of the connecting channel is at least 20 times a height of fall between upper water and lower water.

4. The shaft power plant of claim 1, wherein the connecting channel terminates at a height of the power plant modules.

5. The shaft power plant of claim 1, wherein a course of the river bed from the connecting channel to a bottom of the lower water is configured to allow passage of fish, and wherein the course includes one or more from the group consisting of a rock ramp, a rough channel, a fish pass, and a dispersed bed ramp.

6. The shaft power plant of claim 1, wherein the channel walls are higher than the inflow plane at the shaft crowns.

7. The shaft power plant of claim 1, wherein the power plant modules form a transverse structure over an entire width of the river, and wherein the transverse structure is penetrated by the connecting channel in the center of the river.

8. The shaft power plant of claim 1, wherein the connecting channel is located between the at least two power plant modules.

9. The shaft power plant of claim 8, wherein the shafts each comprise a first shaft wall facing towards the lower water, and wherein the first shaft walls of all of the shafts adjoin one another on the respective side of the connecting channel and in this way form a transverse structure over a width of the river.

10. The shaft power plant of claim 9, further comprising first closure elements arranged in the first shaft walls, wherein by displacing the first closure elements an unused outflow from the upper water into the lower water can be adjusted, and wherein an overflow is permanently provided in the first closure elements during normal operation of the shaft power plant.

11. The shaft power plant of claim 10, wherein the shafts each comprise a second shaft wall facing towards the upper water, wherein the second shaft walls of all of the shafts adjoin one another on the respective side of the connecting channel, wherein second closure elements are arranged in the second shaft walls, and wherein by displacing the second closure elements an inflow into the respective shaft can be adjusted.

12. The shaft power plant of claim 11, wherein all of the second closure elements on the respective side of the connecting channel form a common closure plane for simultaneous draining of all of the shafts on the respective side of the connecting channel.

13. The shaft power plant of claim 8, further comprising a river bed defined between the channel walls and extending to the power plant modules.

14. The shaft power plant of claim 1, wherein the turbine generator units are secured with an outlet side to a wall or a base of the respective shaft, and water flows freely around the turbine generator units with the exception of the outlet side.

15. The shaft power plant of claim 1, wherein a horizontally arranged screen surface is provided in the inflow plane that is parallel with the river bed.

16. The shaft power plant of claim 1, further comprising at least one fish guiding channel arranged transversely with respect to the river on an underwater-side of the at least one power plant module, wherein the at least one fish guiding channel leads to the connecting channel.

17. An ecological connecting channel in a transverse structure in a river separating an upper water from a lower water of the river, the ecological connecting channel comprising:
a constant outflow from the upper water into the lower water without generating electricity by energy conversion,
wherein the ecological connecting channel extends from the transverse structure in a direction of the upper water,
wherein the connecting channel is defined on both sides by a channel wall and is at least partially open at a first end side and a second end side.

18. The ecological connecting channel of claim 17, wherein an average gradient of the ecological connecting channel is at least 1:20.

19. The ecological connecting channel of claim 17, wherein a length of the ecological connecting channel is at least 20 times a height of fall between the upper water and lower water.

20. The ecological connecting channel of claim 17, wherein the ecological connecting channel terminates at a height of the transverse structure.

* * * * *